(12) United States Patent
Wilkinson

(10) Patent No.: US 10,215,004 B2
(45) Date of Patent: Feb. 26, 2019

(54) MODULAR PLUNGER FOR A HYDROCARBON WELLBORE

(71) Applicant: Divergent Technologies, LLC, Grand Junction, CO (US)

(72) Inventor: Barry Wilkinson, Grand Junction, CO (US)

(73) Assignee: DIVERGENT TECHNOLOGIES, LLC, Grand Junction, CO (US)

( * ) Notice: Subject to any disclaimer, the term of this patent is extended or adjusted under 35 U.S.C. 154(b) by 182 days.

(21) Appl. No.: 15/235,426

(22) Filed: Aug. 12, 2016

(65) Prior Publication Data

US 2017/0044883 A1  Feb. 16, 2017

Related U.S. Application Data

(60) Provisional application No. 62/204,552, filed on Aug. 13, 2015.

(51) Int. Cl.
E21B 43/12 (2006.01)
(52) U.S. Cl.
CPC .................................. *E21B 43/121* (2013.01)
(58) Field of Classification Search
CPC .................................................... E21B 43/121
See application file for complete search history.

(56) References Cited

U.S. PATENT DOCUMENTS

| | | | |
|---|---|---|---|
| 3,424,066 A | 1/1969 | Moore, Jr. | |
| 4,410,300 A | 10/1983 | Yerian | |
| 6,148,923 A | 11/2000 | Casey | |
| 7,117,947 B2 | 10/2006 | Wilson | |
| 7,121,335 B2 | 10/2006 | Townsend | |
| 7,188,670 B2 | 3/2007 | Amies et al. | |
| 7,448,442 B2 | 11/2008 | Wells | |
| 7,654,314 B2 | 2/2010 | Farris | |
| 7,793,728 B2 | 9/2010 | Bender | |
| 8,151,690 B2 | 4/2012 | Townsend | |
| 8,181,706 B2 | 5/2012 | Tanton | |

(Continued)

FOREIGN PATENT DOCUMENTS

CA      2619544      8/2008

OTHER PUBLICATIONS

Official Action for Canada Patent Application No. 2,938,939, dated Jul. 27, 2017 4 pages.

(Continued)

*Primary Examiner* — Brad Harcourt
(74) *Attorney, Agent, or Firm* — Sheridan Ross P.C.

(57) ABSTRACT

A plunger device for a hydrocarbon wellbore is provided that has replaceable modular components that allow the function of the plunger device to be altered. Concentric sleeves and short sleeves may be selectively disposed about a chassis of the plunger device. One or more short sleeves may be removed to expose an entrance aperture which allows fluid flow to enter an interior volume of the chassis and pass through an exit aperture in the chassis. This configuration allows the plunger to descend down a bore hole more rapidly. However, a well operator may determine that it is advantageous to keep the short sleeve on the chassis to block the entrance aperture. Thus, the weight of the plunger overcomes the pressure in the borehole, and the plunger descends more slowly down the borehole.

18 Claims, 11 Drawing Sheets

(56) References Cited

U.S. PATENT DOCUMENTS

| | | |
|---|---|---|
| 8,347,955 B1 | 1/2013 | Sewell et al. |
| 8,869,902 B2 | 10/2014 | Smith et al. |
| 2004/0165992 A1 | 8/2004 | Vermeeren |
| 2005/0178543 A1* | 8/2005 | Giacomino ............ E21B 43/121 166/250.01 |
| 2007/0267189 A1 | 11/2007 | Wells |
| 2008/0309020 A1 | 12/2008 | Townsend |
| 2009/0272519 A1 | 11/2009 | Green et al. |
| 2012/0211218 A1 | 8/2012 | Munoz |
| 2014/0116714 A1 | 5/2014 | Jefferies et al. |
| 2014/0262204 A1 | 9/2014 | Farris |
| 2014/0326451 A1 | 11/2014 | Longfellow et al. |
| 2015/0053427 A1 | 2/2015 | Suttipisetchart et al. |
| 2016/0245415 A1* | 8/2016 | Boyd .................... E21B 43/123 |

OTHER PUBLICATIONS

Farris "Chemical Deployment System for Plunger Lift Completions," Composite Engineers, Inc., 2006, Presentation for Gas Well De-Liquification Workshop, Denver, CO, Feb. 27-Mar. 1, 2006, 22 pages.

Notice of Allowance for Canada Patent Application No. 2,938,939, dated Jan. 30, 2018 1 page.

* cited by examiner

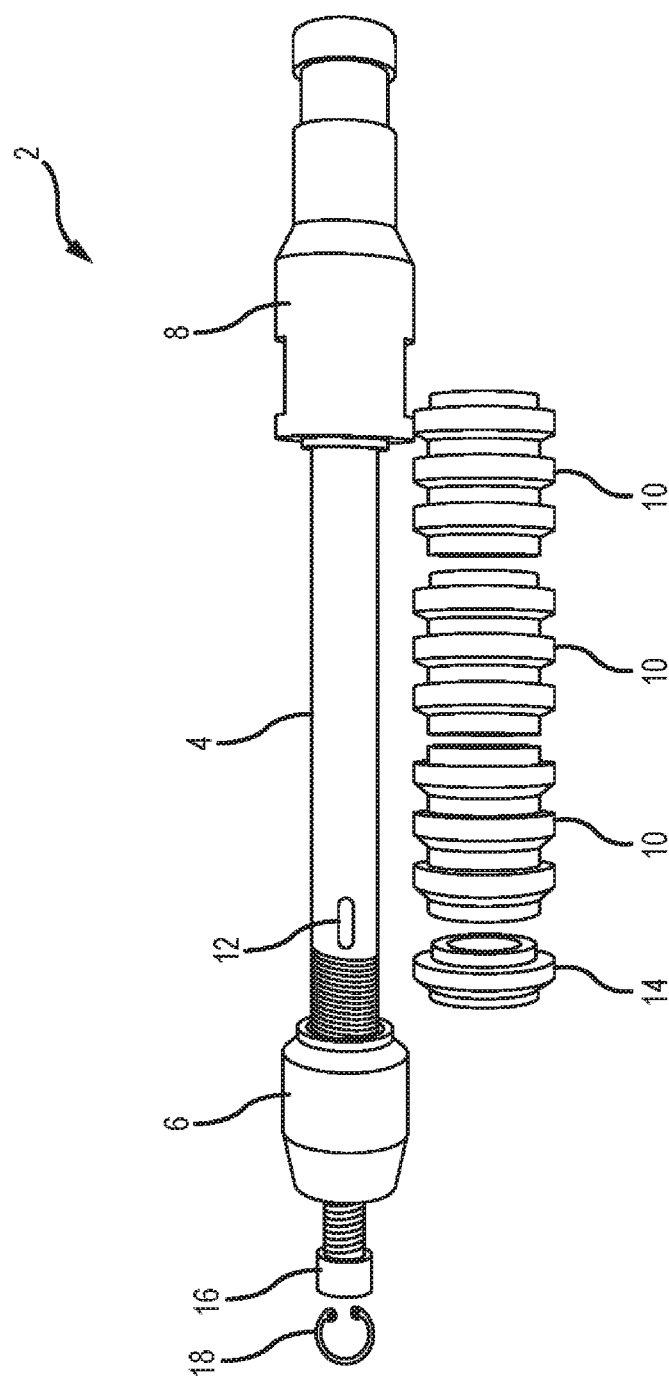

MODULAR PLUNGER FOR A HYDROCARBON WELLBORE

CROSS REFERENCE TO RELATED APPLICATION

This application claims priority under 35 U.S.C. § 119(e) to U.S. Provisional Patent Application Ser. No. 62/204,552 filed Aug. 13, 2015, which is incorporated herein in its entirety by reference.

FIELD OF THE INVENTION

The present invention relates to a plunger for enhancing the production of hydrocarbon fluids and removing water from a wellbore.

BACKGROUND OF THE INVENTION

Plungers are devices used in the oil and gas industry to enhance the recovery of hydrocarbon fluids by reducing a liquid head, which is primarily water. Excessive liquid head and other contaminants can cause a wellbore to slow production, or even cease production altogether. Generally, plungers are periodically and systematically released down a borehole to a predetermined downhole location and then ascend up the borehole, pushing liquid to remove the overall "head" of the fluid column. Sleeves and ribs on the plunger engage the interior surface of the production tubing to extract fluid, gas, and debris as the plunger ascends up the borehole.

Since boreholes may extend thousands of feet below the surface of the Earth, a plunger experiences significant frictional contact with the inner wall of a casing or production tubing. Therefore, plungers frequently wear out, and when plungers wear out, the entire plunger is replaced. Some prior art plungers include replaceable components so the entire plunger is not discarded each time one part of the plunger wears out. Examples of such prior art plungers may be found in U.S. Patent Publication No. 2004/0165992 and U.S. Pat. No. 6,148,923, which are incorporated herein in their entireties by reference.

Another issue with prior art plungers is the inefficient descent speed down the borehole. In a typical configuration, the weight of the plunger overcomes the pressure in the borehole, yet the plunger slowly descends down the borehole. Some prior art plungers have attempted to address this issue with channels or passages that allow fluid to pass through the plunger, thus accelerating the overall "cycle" time that the plunger can be used to enhance production. Examples of such prior art devices may be found in U.S. Pat. Nos. 7,121,335 and 4,410,300, which are incorporated herein in their entireties by reference.

However, no prior art devices address both of these issues simultaneously to provide a plunger that is modular and allows faster descent speeds. There is also a need for a plunger that can deliver chemicals downhole and incorporate electronic devices and sensors for downhole mapping and data collection. These issues, among others, are addressed in the present invention described in detailed below.

SUMMARY OF THE INVENTION

It is therefore an aspect of the present invention to provide a plunger with replaceable, modular components that allows an operator to change out worn sleeves. It is a further aspect to provide a plunger with ports and/or channels to increase the descent speed of the plunger traveling down a borehole. Specifically, it is an aspect of the present invention to selectively permit fluid to flow through an entrance aperture on a chassis of the plunger, through an interior volume of the chassis, and out of the chassis.

It is another aspect of embodiments of the present invention to provide a modular plunger that comprises a short sleeve disposed about a chassis of the plunger. The modular plunger may be equipped with one or more regular-sized sleeves with ribs, wherein the sleeves contact with an inner wall of a casing or tubing. A short sleeve may be positioned on a downhole side of the at least one regular-sized sleeves. The short sleeve may provide an obstructing function where the short sleeve covers the entrance aperture to the interior volume of the chassis. Therefore, an operator may keep the short sleeve on the chassis to block the entrance aperture if the speed needs to be reduced. In this configuration, the weight of the plunger causes the plunger to descend down a borehole against pressure and a fluid column within the borehole. A "short sleeve" is described with respect to embodiments below, but it will be appreciated that the "short sleeve" may be longer than the regular-sized sleeve if the particular shape of the entrance aperture requires a larger "short sleeve."

In other embodiments, an operator may remove the short sleeve to provide access to the entrance aperture and the interior volume of the chassis. Thus, when the plunger is traveling down a borehole, friction between the ribs of the regular-sized sleeves and the casing or tubing causes the regular-sized sleeves to bunch up at an uphole end of the chassis. This reveals the entrance aperture, and fluid in the borehole may pass into the entrance aperture and through an interior volume of the chassis, thus speeding up the descent of the plunger down the borehole. Once the plunger reaches the bottom of the borehole and pressure causes the plunger to start moving back up the borehole, the regular-sized sleeves bunch up toward a downhole end of the chassis and cover the entrance aperture. This configuration blocks any fluid from passing through the plunger, which is beneficial because the primary function of the plunger is to extract undesirable fluid and debris from the casing or production tubing. This also allows borehole pressure to assist the plunger as the plunger ascends up the borehole.

It is another aspect of embodiments of the present invention to provide removable sleeves with a variety of configurations. As noted elsewhere herein, one aspect of the present invention is to provide removable sleeves such that an operator may change out a sleeve if the sleeve becomes worn out, rather than replace then entire plunger. This obviously saves costs. It is another aspect of the invention to provide sleeves that have one or more ribs disposed about an outer surface of the sleeves. The ribs and the spaces between the ribs help extract fluid and debris as the plunger ascends up a borehole. The sleeves may have any number of ribs including zero, one, two, three, etc.

Embodiments of the present invention provide for different configurations of the sleeves or short sleeves to enhance one or more functions of the plunger. For example, the sleeves or short sleeves may comprise a brush or a pad to provide flexibility in the radial dimension of the plunger. With a brush or pad contacting the inner surface of a casing or production tubing, the plunger can more easily negotiate turns in the casing or tubing. In other embodiments, the sleeves or short sleeves may be made from bar stock or another solid material that has less flexibility than a brush or a pad. These sleeves or short sleeves may be more effective at clearing a borehole due to the inflexible nature of the material.

In addition, the sleeves or short sleeves may have a profile that imparts a twist, swirl, or rotation on the sleeves or short sleeves. The ribs may comprise radial ribs, but may also comprise longitudinal channels that are oriented at an angle. Therefore, when the plunger is traveling downhole or uphole, the angle of the longitudinal channels imparts a rotation on the sleeves or short sleeves. The longitudinal channels may cut across some or all of the ribs of a given sleeve or short sleeve. In some embodiments, the longitudinal channels are offset from a longitudinal axis of the chassis when viewed from a side elevation view by an angle of approximately 5 to 45 degrees.

In some embodiments, various components of the plunger may be comprised of materials that improve the performance of the plunger. For example, corrosion and durability may be prime considerations when designing tools that operate in a well hole. The chassis, sleeves, and/or cones may be made from synthetic materials to reduce friction and increase the wear life of the plunger. These materials may include epoxies, resins, plastics, rubbers, polymers, yarns, fibers, plastics, etc. and combinations thereof. There may also be metallurgical considerations when components are made from metal. For example, altering the chrome content of metal, creating parts from stainless steel, coating parts with nickel, etc. may all be methods and materials that improve the performance of the plunger.

It is a further aspect of some embodiments of the present invention to provide a plunger capable of chemical delivery. While the plunger is traveling downhole or uphole in the well, it may be advantageous to deliver a chemical such as corrosion/scale inhibitors, soap, biocides, lubrication, etc. Various volume and dispersal rates may be utilized to effectively deliver the chemical or combinations of chemicals. Some embodiments of the plunger may have one or more ports in the chassis, the sleeves, the short sleeves, the nose cone, and/or the head cone to deliver the chemical. Further, different ports may deliver different chemicals.

It is another aspect of embodiments of the present invention to provide sleeves or short sleeves that do not have their positions along the chassis dictated by gravity or by the friction between the sleeves and the inner surface of the casing or tubing. As described elsewhere herein, sleeves may travel along the longitudinal length of the chassis depending on the direction of the friction between the sleeves and the inner surface of the casing or tubing, i.e., generally whether the plunger is traveling uphole or downhole. In some embodiments, it may be advantageous to have a linear motor, a magnetic system, or any other similar system that positively controls the position of the sleeves along the longitudinal length of the chassis.

It is a further aspect of embodiments of the present invention to provide a plunger that has an electronic system that is capable of performing a variety of functions. For example, a plunger equipped with an electronic system may map the geometry of the well, evaluate the resources or reservoir of resources that the well is designed to extract, record pressure and/or temperature readings, record fluid levels, and perform various diagnostic functions such as corrosion modeling of the casing or production tubing or delivering chemicals at predetermined depths. The electronic system in some embodiments therefore may comprise sensors positioned on one or more of the surfaces of the plunger, a central processing unit and/or memory to store various data, and a first transceiver to establish electronic communication with a second transceiver at the surface of the well.

One particular embodiment of the present invention is a plunger with replaceable components for a hydrocarbon wellbore, comprising a chassis having an uphole end and a downhole end, wherein a head cone having an outer diameter is disposed at the uphole end of the chassis and a nose cone having an outer diameter is selectively interconnected to the downhole end of the chassis; a plurality of sleeves, wherein each sleeve has an aperture, and wherein the plurality of sleeves is disposed about the chassis between the head cone and the nose cone such that the chassis extends through the apertures of the sleeves; and at least one rib disposed on an outer surface of each sleeve, the ribs having an outer diameter, wherein the outer diameter of at least one rib is greater than both the outer diameter of the head cone and the outer diameter of the nose cone.

In some embodiments of the invention, the head cone is integrated with the chassis to form a continuous structure. In various embodiments of the invention, the system further comprises an interior volume defined by an interior surface of the chassis; and an aperture defined by an interior surface of the head cone, wherein the aperture of the head cone provides fluid communication between the interior volume of the chassis and an external environment of the plunger system. In some embodiments of the invention, the system further comprises an entrance aperture in the outer surface of the chassis, wherein the entrance aperture provides fluid communication between the interior volume of the chassis and the external environment of the plunger system. In various embodiments of the invention, the system further comprises a ported bolt configured to selectively interconnect the nose cone to the chassis, wherein the ported bolt has an aperture that provides fluid communication between the interior volume of the chassis and the external environment of the plunger system.

In some embodiments of the invention, the system further comprises a float positioned in the interior volume of the chassis, the float having a density of less than 1000 kg/m$^3$, wherein the float is configured to exit the aperture of the head cone when the float is in the presence of a fluid having a density greater than the float. In various embodiments of the invention, the float is configured to release a chemical in the presence of the fluid having a density greater than the float, wherein the chemical is at least one of a corrosion inhibitor, a scale inhibitor, a soap, a biocide, and a lubricant, which is stored within a chamber positioned within the plunger. In some embodiments of the invention, the system further comprises the selective interconnection between the nose cone and the chassis is a first thread, the first thread having a first thread handedness; and wherein the selective interconnection between the ported bolt and the chassis is a second thread, the second thread having a second thread handedness, wherein the first thread handedness is distinct from the second thread handedness.

In various embodiments of the invention, the system further comprises a snap ring positioned between a head of the ported bolt and the nose cone to prevent rotation of the ported bolt relative to the nose cone. In some embodiments of the invention, the system further comprises a short sleeve having an aperture, the short sleeve disposed about the chassis between the head cone and the nose cone such that the chassis extends through the apertures of the short sleeve, the short sleeve positioned over the entrance aperture to prevent fluid flowing into the interior volume of the chassis.

Another particular embodiment of the invention is a plunger with selectively interchangeable components for enhancing wellbore production from a hydrocarbon well hole, comprising a chassis having an outer surface, an inner surface, a downhole end, and an uphole end, wherein the inner surface of the chassis defines an interior volume; at least one entrance aperture positioned on the chassis, the at least one entrance aperture allows fluid to flow from the outer surface of the chassis to the interior volume of the chassis; at least one exit aperture positioned on the chassis, the at least one exit aperture allows fluid to flow from the interior volume of the chassis to the outer surface of the chassis; a plurality of replaceable sleeves disposed about the outer surface of the chassis, the sleeves having an outer diameter with a predetermined dimension to engage an inner surface of a production tubing; a short sleeve optionally disposed about the chassis, the short sleeve positioned adjacent the plurality of sleeves, and the short sleeve positioned over the at least one entrance aperture to prevent fluid flowing into the interior volume; a nose cone selectively interconnected to the downhole end of the chassis; and a head cone selectively interconnected to the uphole end of the chassis.

In some embodiments of the invention, at least one sleeve of the plurality of sleeves comprises a plurality of ribs on an outer surface of the at least one sleeve. In various embodiments of the invention, at least one rib of the plurality of ribs has an outer diameter that is greater than both an outer diameter of the head cone and an outer diameter of the nose cone. In some embodiments of the invention, at least one rib of the plurality of ribs comprises an uphole angle of approximately 90 degrees. In various embodiments of the invention, at least one rib of the plurality of ribs comprises a downhole angle of approximately 45 degrees.

In some embodiments of the invention, the plunger further comprises a float positioned in the interior volume of the chassis, the float having a density of less than 1000 kg/m$^3$, wherein the float is configured to exit the aperture of the head cone when the float is in the presence of a fluid having a density greater than the float. In various embodiments of the invention, the float is configured to release a chemical in the presence of the fluid having a density greater than the float, wherein the chemical is at least one of a corrosion inhibitor, a scale inhibitor, a soap, a biocide, and a lubricant, which is stored within a chamber positioned within the plunger. In some embodiments of the invention, the at least one entrance aperture comprises a longitudinal dimension, and the short sleeve comprises a longitudinal dimension, wherein the longitudinal dimension of the short sleeve is larger than the longitudinal dimension of the at least one entrance aperture. In various embodiments of the invention, the nose cone comprises an outer surface having at least one groove oriented at an angle relative to a longitudinal dimension of the nose cone, wherein fluid moving parallel to the longitudinal dimension of the nose cone imparts rotational movement on the nose cone and the chassis. In some embodiments of the invention, the plunger further comprises a sensor positioned on the outer surface of the chassis, the sensor configured to record a data set; a first electronic device positioned within the chassis, wherein the first electronic device is configured to store the data set from the sensor on a non-transitory computer readable medium; a second electronic device positioned at a wellhead of the hydrocarbon well hole, wherein the first electronic device is configured to transmit the data set to the second electronic device, and the second electronic device is configured to store the data set from the sensor on a non-transitory computer readable medium.

An addition particular embodiment of the invention is a plunger system for a wellbore, comprising a chassis having an uphole end and a downhole end, and a head cone having an outer diameter disposed at the uphole end of the chassis and a nose cone having an outer diameter selectively interconnected to the downhole end of the chassis; an interior volume defined by an interior surface of the chassis; an aperture defined by an interior surface of the head cone, wherein the aperture of the head cone provides fluid communication between the interior volume of the chassis and an external environment of the plunger system; a ported bolt configured to selectively interconnect the nose cone to the chassis, wherein the ported bolt has an aperture that provides fluid communication between the interior volume of the chassis and the external environment of the plunger system; wherein the selective interconnection between the nose cone and the chassis is a first thread; wherein the selective interconnection between the ported bolt and the chassis is a second thread, wherein the first thread is distinct from the second thread; a plurality of replaceable sleeves, wherein each sleeve has an aperture, and wherein the plurality of sleeves is disposed about the chassis between the head cone and the nose cone such that the chassis extends through the apertures of the sleeves; at least one rib disposed on an outer surface of each replaceable sleeve, the ribs having an outer diameter, wherein the outer diameter of at least one rib is greater than both the outer diameter of the head cone and the outer diameter of the nose cone; and a float positioned in the interior volume of the chassis, the float having a density of less than 1000 kg/m3, wherein the float is configured to exit the aperture of the head cone when the float is in the presence of a fluid having a density greater than the float, wherein the float is configured to release a chemical in the presence of the fluid having a density greater than the float, wherein the chemical is at least one of a corrosion inhibitor, a scale inhibitor, a soap, a biocide, and a lubricant, which is stored within a chamber positioned within the plunger.

These and other advantages will be apparent from the disclosure of the present invention(s) contained herein. The above-described embodiments, objectives, and configurations are neither complete nor exhaustive. The Summary of the Invention is neither intended nor should it be construed as being representative of the full extent and scope of the present invention. Moreover, references made herein to "the present invention" or aspects thereof should be understood to mean certain embodiments of the invention and should not necessarily be construed as limiting all embodiments to a particular description. The present invention is set forth in various levels of detail in the Summary of the Invention as well as in the attached drawings and Detailed Description and no limitation as to the scope of the present invention is intended by either the inclusion or non-inclusion of elements, components, etc. in this Summary of the Invention. Additional aspects of the present invention will become more readily apparent from the Detailed Description particularly when taken together with the drawings.

BRIEF DESCRIPTION OF THE DRAWINGS

The accompanying drawings, which are incorporated in and constitute a part of the specification, illustrate embodiments of the disclosure and together with the general description of the disclosure given above and the detailed description of the drawings given below, serve to explain the principles of the disclosures.

FIG. 3A is a perspective view of a disassembled plunger in accordance with various embodiments of the invention;

Figure 1:
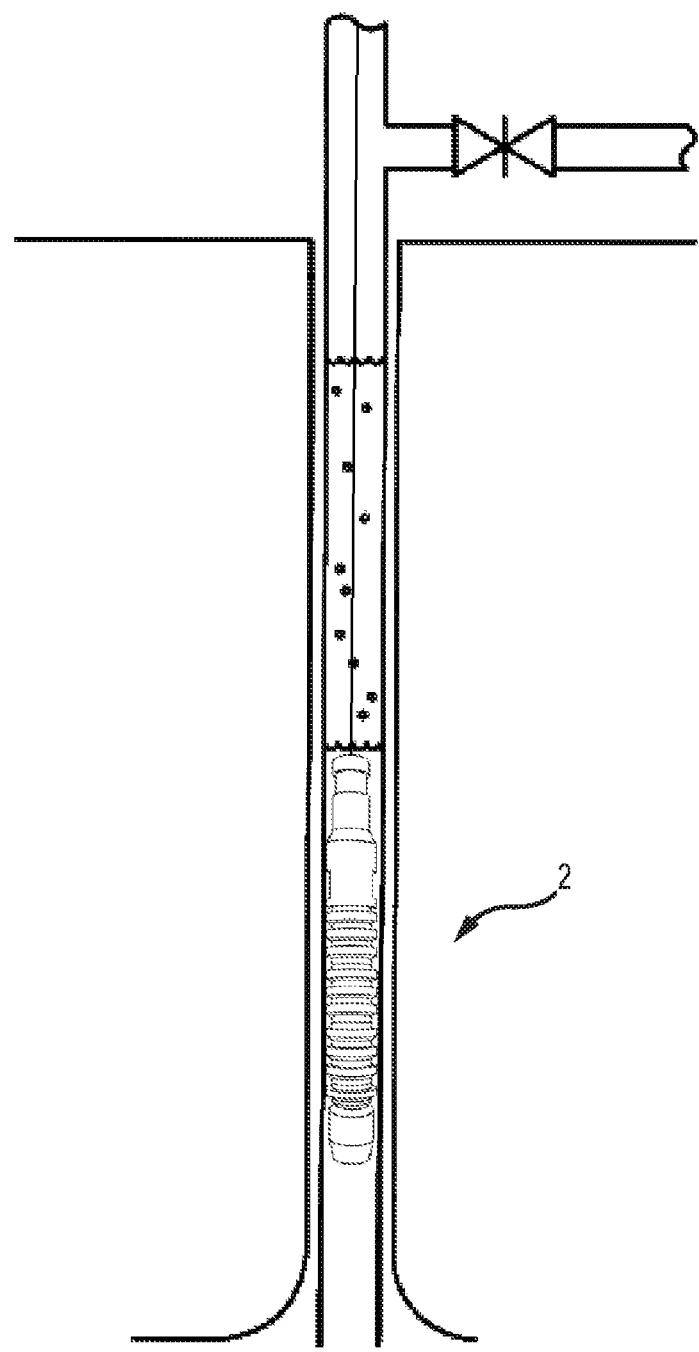
FIG. 1 is a cross-sectional view of a wellbore system with a plunger in accordance with various embodiments of the invention.

To assist in the understanding of the embodiments of the present invention the following list of components and associated numbering found in the drawings is provided herein:

| Component No. | Component |
| --- | --- |
| 2 | Plunger |
| 4 | Chassis |
| 6 | Nose Cone |
| 8 | Head Cone |
| 10 | Sleeve |
| 12 | Entrance Aperture |
| 14 | Short Sleeve |
| 16 | Bolt |
| 18 | Snap Ring |
| 20 | First Thread |
| 22 | Second Thread |
| 24 | Sleeve Length |
| 26 | Short Sleeve Length |
| 28 | Overall Sleeve Length |
| 30 | Sleeve Rib Diameter |
| 32 | Sleeve Outer Diameter |
| 34 | First Rib Uphole Length |
| 36 | Second Rib Uphole Length |
| 38 | Third Rib Uphole Length |
| 40 | First Rib Downhole Length |
| 42 | Second Rib Downhole Length |
| 44 | First Rib Downhole Angle |
| 46 | Second Rib Downhole Angle |
| 48 | Third Rib Downhole Angle |
| 50 | Short Sleeve Rib Diameter |
| 52 | Short Sleeve Outer Diameter |
| 54 | Short Sleeve First Uphole Length |
| 56 | Short Sleeve First Downhole Length |
| 58 | Short Sleeve Rib Angle |
| 60 | Entrance Aperture Length |

-continued

| Component No. | Component |
| --- | --- |
| 62 | Entrance Aperture Width |
| 64 | Chassis Diameter |
| 66 | Nose Notch Length |
| 68 | Notch to Notch Length |
| 70 | Nose Notch to Head Length |
| 72 | Nose Diameter |
| 74 | Nose Recess Length |
| 76 | Head Diameter |
| 78 | Head Recess Diameter |
| 80 | Head Length |
| 82 | Head Recess Length |
| 84 | Head Shoulder Length |
| 86 | Head-to-Chassis Outer Diameter Length |
| 88 | Nose Cone Diameter |
| 90 | Nose Cone Slope Diameter |
| 92 | Nose Cone Slope Length |
| 94 | Nose Cone Aperture |
| 96 | First Head Cone Inner Diameter |
| 98 | Second Head Cone Inner Diameter |
| 100 | Third Head Cone Inner Diameter |
| 102 | First Head Cone Outer Diameter |
| 104 | Head Cone Aperture |
| 106 | Head Cone Aperture Offset |
| 108 | Head Cone First Shoulder Length |
| 110 | Head Cone First Shoulder Transition |
| 112 | Head Cone Second Shoulder Length |
| 114 | Head Cone Second Shoulder Transition |
| 116 | Head Cone Recess Length |
| 118 | Head Cone Length |
| 120 | Head Cone Outer Diameter |
| 122 | Head Cone Recess Diameter |
| 124 | Pump |
| 126 | Port |
| 128 | Controller |
| 130 | Chemical Float |
| 132 | Central Processing Unit |
| 134 | Sensor |
| 136 | First Transceiver |
| 138 | Second Transceiver |

It should be understood that the drawings are not necessarily to scale, and various dimensions may be altered. In certain instances, details that are not necessary for an understanding of the present invention or that render other details difficult to perceive may have been omitted. It should be understood, of course, that the present invention is not necessarily limited to the particular embodiments illustrated herein.

DETAILED DESCRIPTION

The present invention has significant benefits across a broad spectrum of endeavors. It is the Applicant's intent that this specification and the claims appended hereto be accorded a breadth in keeping with the scope and spirit of the present invention being disclosed despite what might appear to be limiting language imposed by the requirements of referring to the specific examples disclosed. To acquaint persons skilled in the pertinent arts most closely related to the present invention, a preferred embodiment that illustrates the best mode now contemplated for putting the present invention into practice is described herein by, and with reference to, the annexed drawings that form a part of the specification. The exemplary embodiment is described in detail without attempting to describe all of the various forms and modifications in which the present invention might be embodied. As such, the embodiments described herein are illustrative, and as will become apparent to those skilled in the arts, and may be modified in numerous ways within the scope and spirit of the present invention.

Although the following text sets forth a detailed description of numerous different embodiments, it should be understood that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning.

Various embodiments of the present invention are described herein and as depicted in the drawings. It is expressly understood that although the figures show plungers, sleeves, and other components, the present invention is not limited to these embodiments.

Now referring to FIG. 1, a cross-sectional view of a wellbore with a plunger 2 is provided. The plunger 2 is positioned partway down the wellbore and is in the process of ascending up the wellbore. A plug of liquid such as water is collected above the plunger 2 and carried towards the surface of the wellbore as the plunger 2 ascends.

Figure 2:
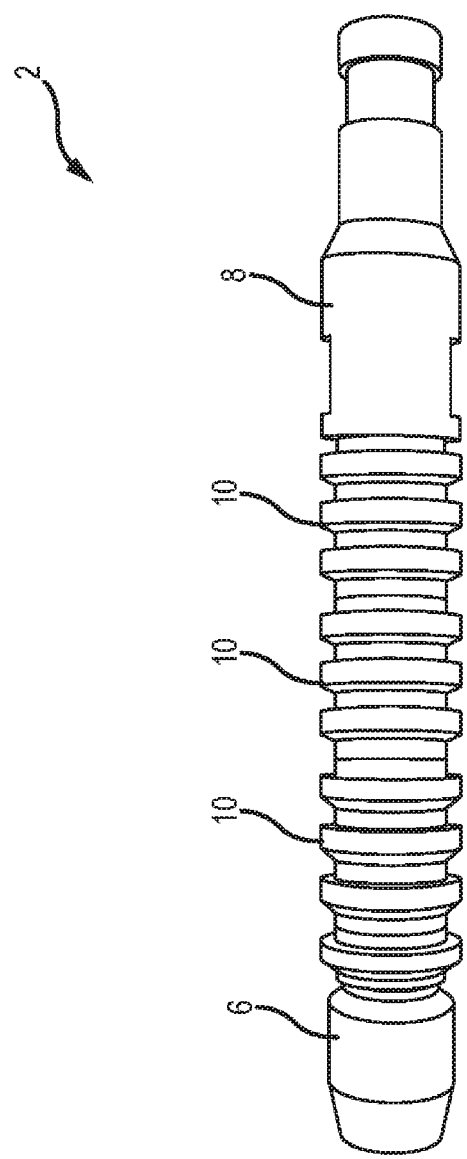
FIG. 2 is a perspective view of an assembled plunger in accordance with various embodiments of the invention.

Now referring to FIG. 2, a perspective view of an assembled plunger 2 is provided. The plunger 2 comprises a nose cone 6, a head cone 8, and a plurality of sleeves 10 disposed therebetween. The plunger 2 descends nose-first down a casing or tubing. Then, when the plunger 2 starts ascending up the casing or tubing, ribs on the sleeves 10 contact the inner walls of the casing or tubing to extract a head fluid, for example, water.

Now referring to FIG. 3A, a perspective view of a disassembled plunger 2 is provided. A chassis 4 and a head cone 8 are a single component in this embodiment, and the nose cone 6 is selectively interconnected to the chassis 4. A series of sleeves 10, including a short sleeve 14, are selectively positioned about a center portion of the chassis 4 and against the head cone 8. The sleeves 10, 14 are secured in place for operation after the nose cone 6 is selectively interconnected to the downhole end of the chassis 4. In this embodiment, three regular-sized sleeves 10 are disposed toward the uphole end of the chassis 4, and the short sleeve 14 is disposed toward the downhole end of the chassis 4. Having a plurality of sleeves 10, 14 allows a well operator to change out a sleeve when the sleeve becomes too worn out instead of having to change out the entire plunger 2.

Next, an entrance aperture 12 is provided on the chassis 4. The entrance aperture 12 provides access for a fluid to travel from an outer surface of the chassis 4 into an interior volume of the chassis 4. The fluid may then move through the interior volume of the chassis 4 and out of an exit aperture disposed in one or both of the head cone 8 and an uphole end of the chassis 4. As shown in this embodiment, the entrance aperture 12 is disposed underneath the short sleeve 14, and the length of the entrance aperture 12 is approximately the same as the length of the short sleeve 14. However, it will be appreciated that in other embodiments, the length of the entrance aperture 12 may be shorter or longer than the length of the short sleeve 14. In the embodiment shown in FIG. 3A, when the short sleeve 14 is removed, the entrance aperture 24 provides access to fluids outside of the plunger 2 to enter the chassis 4.

Specifically, with the short sleeve 14 removed, the motion of the plunger 2 dictates when the entrance aperture 12 is exposed and can allow fluid to enter the chassis 4. When the plunger 2 is traveling downhole and the short sleeve 14 is removed, the friction between the ribs of the regular-sized sleeves 10 and the wall of the production tubing or casing causes the sleeves 10 to bunch together at the uphole end of the chassis 4 against the head cone 8. Thus, the entrance aperture 12 is exposed. When the plunger 2 reaches the bottom of a borehole, there is no longer dynamic friction between the ribs of the sleeves 10 and the wall of the tubing or casing. Therefore, the sleeves 10 may cover or partially cover the entrance aperture 12. Then finally, when the pressure in the borehole is great enough, the plunger 2 begins to move uphole, and the friction between the ribs of the sleeves 10 and wall of the tubing or casing returns, but in the opposite direction. Accordingly, the sleeves 10 bunch together at the downhole end of the chassis 2, against the nose cone 6, and over the entrance aperture 12 which prevents fluid from entering the interior volume of the chassis 2. By having the entrance aperture 12 open on the descent down the borehole and closed on the ascent, the plunger 2 may travel more easily downhole against the pressure within the borehole, and then use the same pressure to assist the uphole ascent of the plunger 2. The operator has the option of keeping the short sleeve 14 over the entrance aperture 12 and allowing the weight of the plunger 2 to overcome the pressure in the borehole as the plunger 2 descends down the borehole.

Figure 3B:
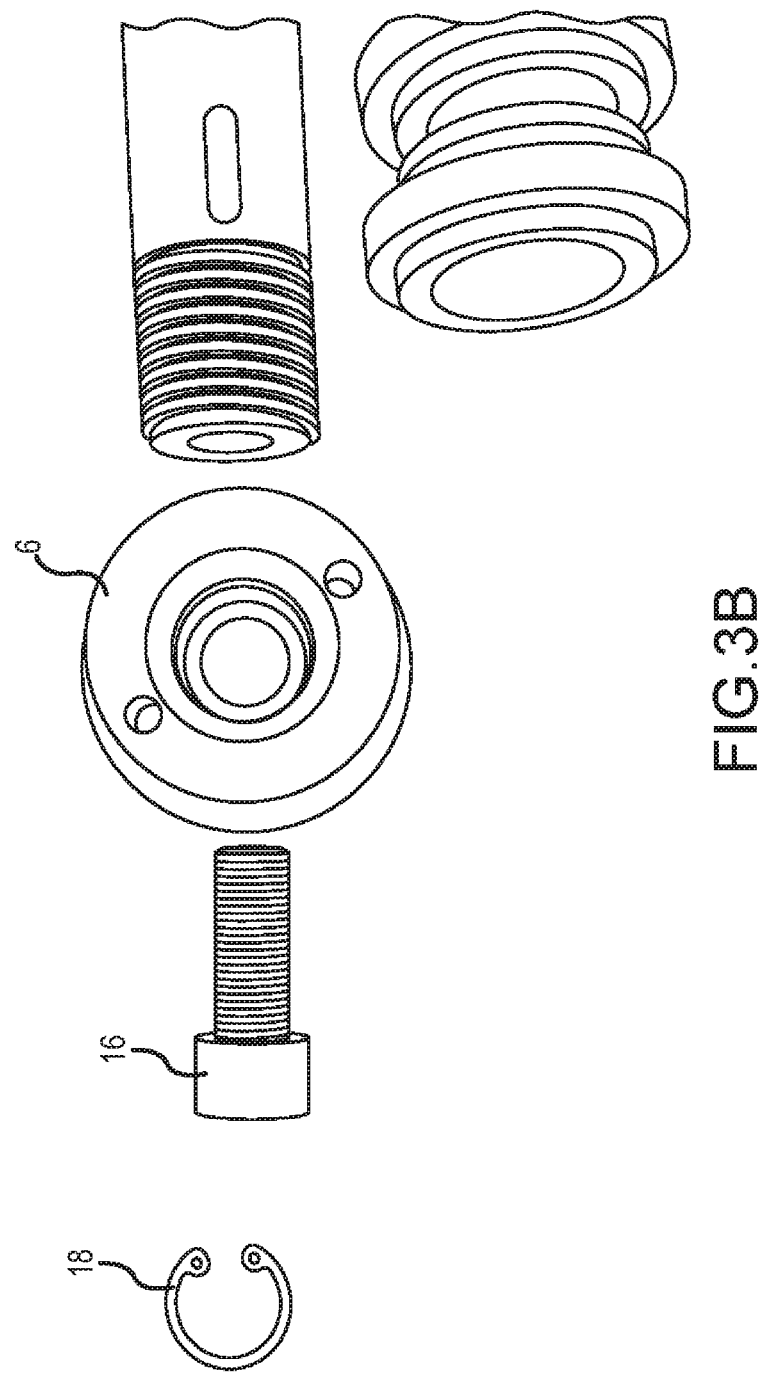
FIG. 3B is a perspective view of a nose cone of a plunger in accordance with various embodiments of the invention.
Figure 3C:
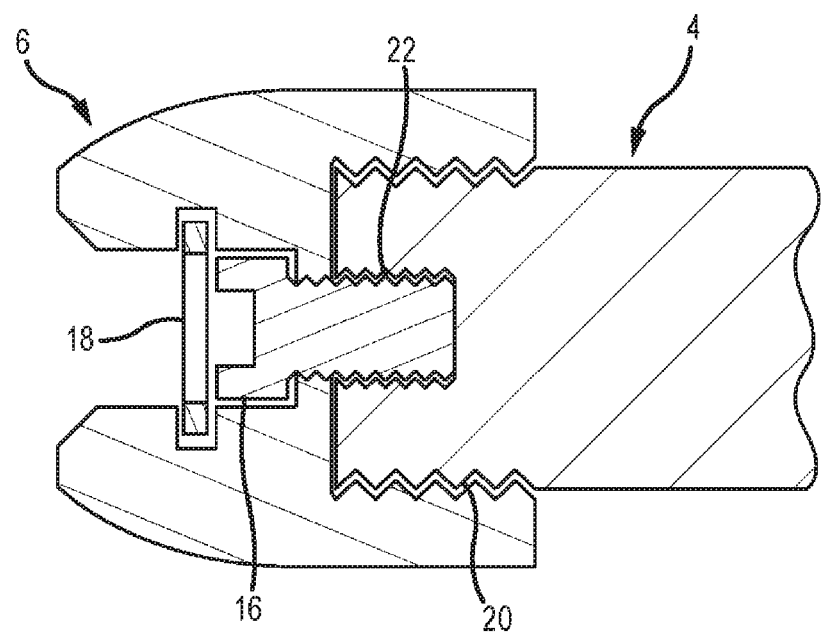
FIG. 3C is a cross-sectional view of a nose cone of a plunger in accordance with various embodiments of the invention.

Next, as shown in FIGS. 3A-3C, the nose cone 6 is selectively interconnected to a downhole end of the chassis 4. Once the nose cone 6 is selectively interconnected, the nose cone 6 is secured in place by a bolt 16 and a snap ring 18. The bolt 16 in this embodiment threads through the nose cone 6 and into the downhole end of the chassis 4. Then, a snap ring 18 prevents rotation of the bolt 16 relative to the nose cone 6. Specifically referring to FIG. 3C, a first thread 20 is a threadable interconnection between the nose cone 6 and the chassis 4, and a second thread 22 is a threadable interconnection between the bolt 16 and the chassis 4. It will be appreciated that in some embodiments the first thread 20 has a different handedness than the second thread 22 to help secure the nose cone 6 to the chassis 4. For example, the first thread 20 may be a right-hand thread, and the second thread 22 may be a left-hand thread, or vice versa.

As described above, the entrance aperture 12 may allow fluid to pass through the chassis 4, but in some embodiments, the bolt 16 may be ported along a longitudinal axis of the bolt 16 to permit fluid flow from the nose cone 6 through the chassis 4. In addition, features such as chemical delivery floats may be included in the interior volume of the chassis 4 as described in further detail in FIG. 10 below.

Figure 4:
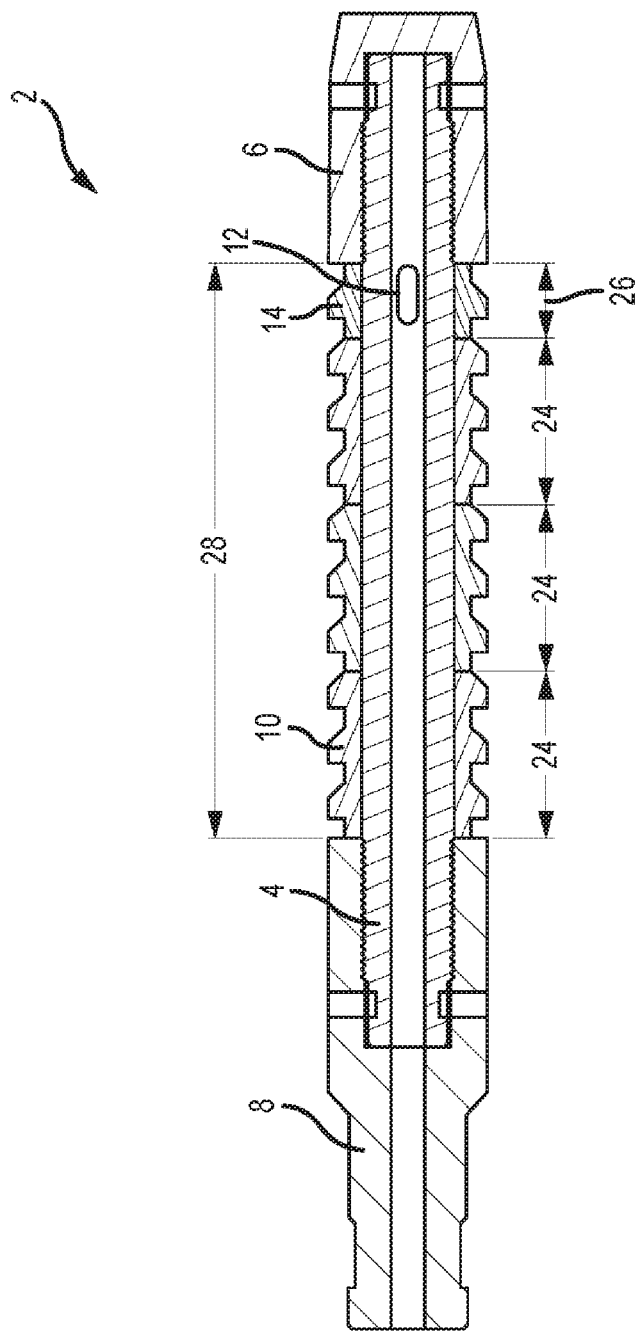
FIG. 4 is a cross-sectional view of a plunger having sleeves and a short sleeve in accordance with various embodiments of the invention.

Now referring to FIG. 4, a cross-sectional view of a plunger 2 taken along a longitudinal plane of the plunger 2 is provided. The plunger 2 comprises a chassis 4 that generally extends along the longitudinal length of the plunger 2. A nose cone 6 is selectively interconnected to a downhole end of the plunger 2. As noted above, the nose cone 6 may comprise one or more apertures where a screw, a bolt, or other fastening means may be utilized to secure the nose cone 6 to the chassis 4. The chassis 4 may comprise a threaded aperture or a recess to receive the fastening means to promote the selective interconnection between the nose cone 6 and the chassis 4.

Similarly, in this particular embodiment a head cone 8 is selectively interconnected to an uphole end of the chassis 4. The head cone 8 may also comprise one or more apertures in some embodiments such that a screw, bolt, or other fastening means may be used to selectively interconnect the head cone 8 to the chassis 4. The head cone 8 also comprises an uphole end that provides a location for other components to selectively interconnect to the whole plunger 2. It will be appreciated that while the cones 6, 8 in this embodiment are modular in nature, in some embodiments, one or more of the cones 6, 8 may be integrated with the chassis 4 to form a continuous structure.

As shown in FIG. 4, the sleeves 10, 14 have various lengths. In some embodiments of the present invention, the sleeve length 24 is between approximately 0.5 inches and 6 inches. In various embodiments of the present invention, the sleeve length 24 is between approximately 1.5 inches and 2.5 inches. In some embodiments, the sleeve length 24 is approximately 1.992 inches. It will be appreciated that while the sleeve lengths 24 shown in FIG. 4 are the same length, other embodiments of the present invention may utilize sleeves with varying lengths 24. For example, the sleeve lengths 24 may become progressively smaller or larger in the uphole or downhole directions. In yet a further example, the sleeve lengths 24 may be random in sequence.

In addition, the short sleeve 14 has a length 26. In some embodiments, the short sleeve length 26 is between approximately 0.25 inches and 3 inches. In various embodiments, the short sleeve length 26 is between approximately 0.25 inches and 1.25 inches. In some embodiments, the short sleeve length 26 is approximately 0.878 inches.

The combined length of the various sleeves 10 and short sleeves 14 may be referred to as the overall sleeve length 28. In some embodiments, the overall length of the sleeves 28 is between approximately 3 inches and 12 inches. In various embodiments, the overall length of the sleeves 28 is between approximately 5 inches and 7.5 inches. In some embodiments, the overall length of the sleeves 28 is approximately 6.886 inches.

Figure 5:
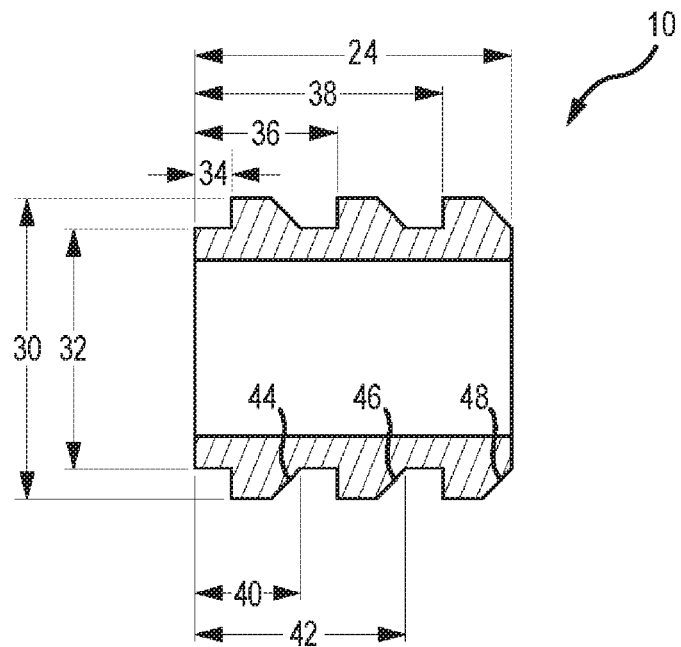
FIG. 5 is a cross-sectional view of a sleeve in accordance with various embodiments of the invention.

Now referring to FIG. 5, a cross-sectional view of the sleeve 10 taken along a longitudinal plane of the sleeve 10 is provided. The sleeve 10 in this embodiment has three ribs that laterally extend around an outer surface of the sleeve 10. It will be appreciated that in other embodiments, the sleeve 10 may have a fewer or greater number of ribs including zero ribs, in which case the entire outer surface of the sleeve 10 contacts the wall of the tubing or casing.

In some embodiments, a sleeve rib diameter 30 is between approximately 0.5 inches and 4.0 inches. In various embodiments, the sleeve rib diameter 30 is between approximately 1.5 inches and 2.5 inches. In some embodiments, the sleeve rib diameter 30 is approximately 1.9 inches.

In some embodiments, a sleeve outer diameter 32 is between approximately 0.5 inches and 4.0 inches. In various embodiments, the sleeve outer diameter 32 is between approximately 1.0 inch and 2.0 inches. In some embodiments, the sleeve outer diameter 32 is approximately 1.5 inches.

In some embodiments, a first rib uphole length 34 is between approximately 0.0 inches to 1.0 inch. In various embodiments, the first rib uphole length 34 is between approximately 0.100 inches and 0.500 inches. In some embodiments, the first rib uphole length 34 is approximately 0.214 inches.

In some embodiments, a second rib uphole length 36 is between approximately 0.1 inches to 3.0 inches. In various embodiments, the second rib uphole length 36 is between approximately 0.2 inches and 1.5 inches. In some embodiments, the second rib uphole length 36 is approximately 0.878 inches.

In some embodiments, a third rib uphole length 38 is between approximately 0.8 inches to 3.0 inches. In various embodiments, the third rib uphole length 38 is between approximately 1.2 inches and 2.0 inches. In some embodiments, the third rib uphole length 38 is approximately 1.542 inches.

In some embodiments, a first rib downhole length 40 is between approximately 0.1 inches to 3.0 inches. In various embodiments, the first rib downhole length 40 is between approximately 0.3 inches and 1.0 inch. In some embodiments, the first rib downhole length 40 is approximately 0.664 inches.

In some embodiments, a second rib downhole length 42 is between approximately 0.4 inches to 4.0 inches. In various embodiments, the second rib downhole length 42 is between approximately 0.8 inches and 2.0 inches. In some embodiments, the second rib downhole length 42 is approximately 1.328 inches.

The ribs of the sleeve 10 also have a specific shape in the embodiment in FIG. 5. The ribs form a right angle with the sleeve 10 at an uphole end of the rib, and the ribs form an acute angle with the sleeve 10 at a downhole end of the rib. In some embodiments, a first rib downhole angle 44 is between approximately 15 degrees to 75 degrees. In various embodiments, the first rib downhole angle 44 is between approximately 35 degrees and 55 degrees. In some embodiments, the first rib downhole angle 44 is approximately 45 degrees.

In some embodiments, a second rib downhole angle 46 is between approximately 15 degrees to 75 degrees. In various embodiments, the second rib downhole angle 46 is between approximately 35 degrees and 55 degrees. In some embodiments, the second rib downhole angle 46 is approximately 45 degrees.

In some embodiments, a third rib downhole angle 48 is between approximately 15 degrees to 75 degrees. In various embodiments, the third rib downhole angle 48 is between approximately 35 degrees and 55 degrees. In some embodiments, the third rib downhole angle 48 is approximately 45 degrees.

It will be appreciated that other embodiments may have other configurations of ribs. For example, it may be advantageous in some embodiments to have the uphole right angle and the downhole acute angle reversed. Further, in some embodiments, the ribs may have a continuously curved shape. For example, the curve of the ribs may be defined with a constant radius or a n-order polynomial. Further yet, the ribs on a given sleeve 10 may not be identical. For example, the angles that the ribs form with the sleeve 10 may get progressively larger or smaller in the downhole or uphole direction. And in some other embodiments, the change in rib shapes and angles may be random in sequence.

Figure 6:
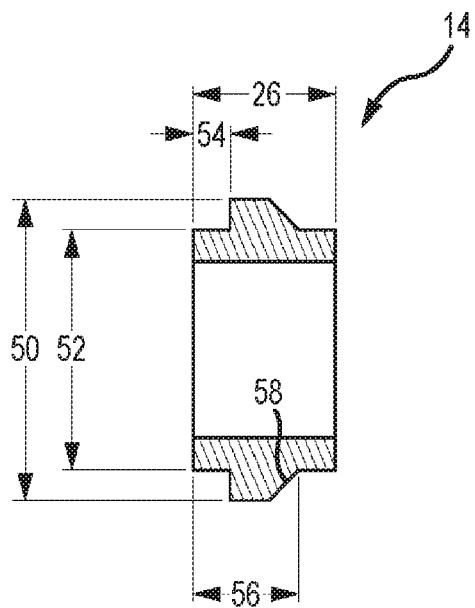
FIG. 6 is a cross-sectional view of a short sleeve in accordance with various embodiments of the invention.

Now referring to FIG. 6, a cross-sectional view of a short sleeve 14 taken along a longitudinal plane of the short sleeve 14 is provided. The short sleeve 14 in this embodiment has one rib that extends around an outer surface of the short sleeve 14. However, similar to the sleeve 10, the short sleeve 14 may have many different configurations of rib numbers, rib angles, rib shapes, etc.

In some embodiments, a short sleeve rib diameter 50 is between approximately 0.5 inches and 4.0 inches. In various embodiments, the short sleeve rib diameter 50 is between approximately 1.5 inches and 2.5 inches. In some embodiments, the short sleeve rib diameter 50 is approximately 1.9 inches.

In some embodiments, a short sleeve outer diameter 52 is between approximately 0.5 inches and 4.0 inches. In various embodiments, the short sleeve outer diameter 52 is between approximately 1.0 inch and 2.0 inches. In some embodiments, the short sleeve outer diameter 52 is approximately 1.5 inches.

In some embodiments, a short sleeve first uphole length 54 is between approximately 0.0 inches to 1.0 inch. In various embodiments, the short sleeve first uphole length 54 is between approximately 0.100 inches and 0.500 inches. In some embodiments, the short sleeve first uphole length 54 is approximately 0.214 inches.

In some embodiments, a short sleeve first downhole length 56 is between approximately 0.1 inches to 3.0 inches. In various embodiments, the short sleeve first downhole length 56 is between approximately 0.3 inches and 1.0 inch. In some embodiments, the short sleeve first downhole length 56 is approximately 0.664 inches.

In some embodiments, a short sleeve rib angle 58 is between approximately 15 degrees to 75 degrees. In various embodiments, the short sleeve rib angle 58 is between approximately 35 degrees and 55 degrees. In some embodiments, the short sleeve rib angle 58 is approximately 45 degrees.

Figure 7:
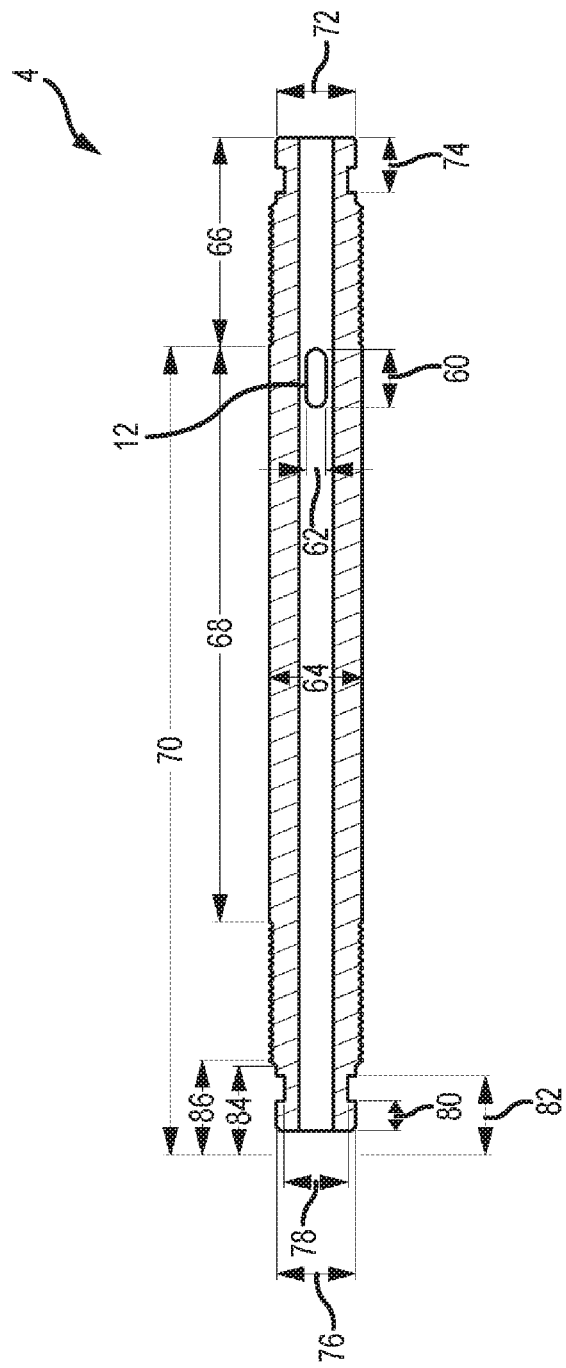
FIG. 7 is a cross-sectional view of a chassis in accordance with various embodiments of the invention.

Now referring to FIG. 7, a cross-sectional view of the chassis 4 taken along a longitudinal plane of the chassis 4 is provided. Various dimensions of the entrance aperture are provided. In some embodiments, an entrance aperture length 60 is between approximately 0.25 inches and 1.5 inches. In various embodiments, the entrance aperture length 60 is between approximately 0.5 inches and 1.0 inch. In some embodiments, the entrance aperture length 60 is approximately 0.69 inches. In some embodiments, an entrance aperture width 62 is between approximately 0.0625 inches and 1.0 inch. In various embodiments, the entrance aperture width 62 is between approximately 0.125 inches and 0.5 inches. In some embodiments, the entrance aperture width 62 is approximately 0.19 inches.

In some embodiments, a chassis diameter 64 is between approximately 0.375 inches and 3.0 inches. In various embodiments, the chassis diameter 64 is between approximately 0.75 inches and 1.625 inches. In some embodiments, the chassis diameter 64 is approximately 1.125 inches.

References characters 66, 68, and 70 define the locations of two circumferential notches on the outer surface of the chassis 4. The notches provide a location for an interference fit or a friction fit with a corresponding rib or protrusion on one or both of the nose cone 6 and the head cone 8. In some embodiments, a nose notch length 66 is between approximately 1.0 inches and 4.0 inches. In various embodiments, the nose notch length 66 is between approximately 1.8 inches and 3.0 inches. In some embodiments, the nose notch length 66 is approximately 2.386 inches. In some embodiments, a notch to notch length 68 is between approximately 2.0 inches and 12.0 inches. In various embodiments, the notch to notch length 68 is between approximately 6.0 inches and 7.5 inches. In some embodiments, the notch to notch length 68 is approximately 6.625 inches. In some embodiments, a nose notch to head length 70 is between approximately 4.0 inches and 15.0 inches. In various embodiments, the nose notch to head length 70 is between approximately 8.0 inches and 11.5 inches. In some embodiments, the nose notch to head length 70 is approximately 9.3 inches.

The nose end of the chassis 4 has a recess dimension and other dimensions that allow for the reception of a screw, a bolt, or other fastening means. In some embodiments, the nose diameter 72 is between approximately 0.4 inches and 2.0 inches. In various embodiments, the nose diameter 72 is between approximately 0.7 inches and 1.3 inches. In some embodiments, the nose diameter 72 is approximately 0.968 inches. In some embodiments, the nose recess length 74 is between approximately 0.3 inches and 2.0 inches. In various embodiments, the nose recess length 74 is between approximately 0.5 inches and 0.8 inches. In some embodiments, the nose recess length 74 is approximately 0.664 inches.

The head end of the chassis 4 has a recess dimension and other dimensions that allow for the reception of a screw, a bolt, or other fastening means. In some embodiments, a head diameter 76 is between approximately 0.4 inches and 2.0 inches. In various embodiments, the head diameter 76 is between approximately 0.7 inches and 1.3 inches. In some embodiments, the head diameter 76 is approximately 0.968 inches.

In some embodiments, a head recess diameter 78 is between approximately 0.3 inches and 1.5 inches. In various embodiments, the head recess diameter 78 is between approximately 0.6 inches and 1.2 inches. In some embodiments, the head recess diameter 78 is approximately 0.788 inches.

In some embodiments, a head length 80 is between approximately 0.1 inches and 1 inch. In various embodiments, the head length 80 is between approximately 0.25 inches and 0.60 inches. In some embodiments, the head length 80 is approximately 0.35 inches.

In some embodiments, a head recess length 82 is between approximately 0.4 inches and 1.8 inches. In various embodiments, the head recess length 82 is between approximately 0.7 inches and 1.3 inches. In some embodiments, the head recess length 82 is approximately 0.953 inches. It will be appreciated that the uphole and downhole ends of the chassis 4 may have the same dimensions or different dimensions.

In some embodiments, a head shoulder length 84 is between approximately 0.5 inches and 2.0 inches. In various embodiments, the head shoulder length 84 is between approximately 0.75 inches and 1.25 inches. In some embodiments, the head shoulder length 84 is approximately 1.06 inches.

In some embodiments, a head-to-chassis outer diameter length 86 is between approximately 0.5 inches and 2.0 inches. In various embodiments, the head-to-chassis outer diameter length 86 is between approximately 0.75 inches and 1.375 inches. In some embodiments, the head-to-chassis outer diameter length 86 is approximately 1.13 inches.

Figure 8:
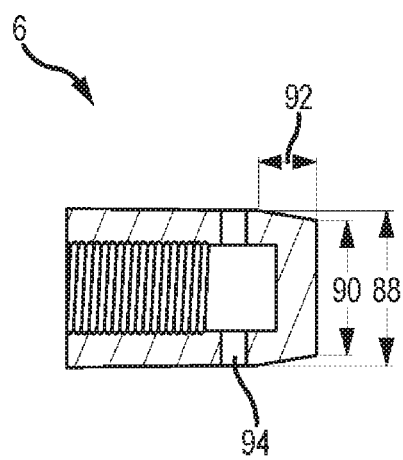
FIG. 8 is a cross-sectional view of a nose cone in accordance with various embodiments of the invention.

Now referring to FIG. 8, a cross-sectional view of a nose cone 6 taken along a longitudinal plane of the nose cone 6 is provided. The nose cone 6 tapers to a flat end to channel fluid to an outer surface of the overall plunger. However, it will be appreciated that the nose cone 6 may come in a variety of shapes, some shapes that channel fluid to an outer surface of the plunger and some shapes that do not. In some embodiments, a nose cone diameter 88 is between approximately 0.5 inches and 4.0 inches. In various embodiments, the nose cone diameter 88 is between approximately 1.5 inches and 2.5 inches. In some embodiments, the nose cone diameter 88 is approximately 1.9 inches. In some embodiments, a nose cone slope diameter 90 is between approximately 1.2 inches and 2.0 inches. In various embodiments, the nose cone slope diameter 90 is between approximately 1.5 inches and 1.75 inches. In some embodiments, the nose cone slope diameter 90 is approximately 1.627 inches. In some embodiments, a nose cone slope length 92 is between approximately 0.25 inches and 2.0 inches. In various embodiments, the nose cone slope length 92 is between approximately 0.5 inches and 1.0 inch. In some embodiments, the nose cone slope length 92 is approximately 0.75 inches.

In addition, the nose cone 6 shown in FIG. 8 also comprises at least one aperture 94 that provides a location for a screw, a bolt, or other fastening means to pass through, which allows the selective interconnection between the nose cone 6 and the chassis.

Figure 9:
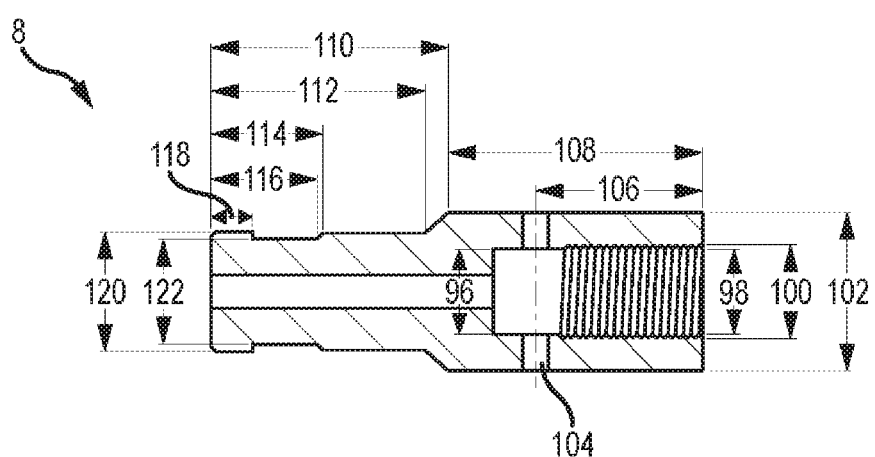
FIG. 9 is a cross-sectional view of a head cone in accordance with various embodiments of the invention.

Now referring to FIG. 9, a cross-sectional view of the head cone 8 taken along a longitudinal plane of the head cone 8 is provided. On the downhole end of the head cone 8, a recess is provided that has several dimensions, including several inner diameter dimensions. In some embodiments, the first head cone inner diameter 96 is between approximately 0.5 inches and 2.0 inches. In various embodiments, the first head cone inner diameter 96 is between approximately 0.75 inches and 1.25 inches. In some embodiments, the first head cone inner diameter 96 is approximately 0.9 inches. In some embodiments, the second head cone inner diameter 98 is between approximately 0.5 inches and 2.0 inches. In various embodiments, the second head cone inner diameter 98 is between approximately 0.75 inches and 1.25 inches. In some embodiments, the second head cone inner diameter 98 is approximately 0.915 inches. In some embodiments, the third head cone inner diameter 100 is between approximately 0.625 inches and 2.0 inches. In various embodiments, the third head cone inner diameter 100 is between approximately 0.875 inches and 1.25 inches. In some embodiments, the third head cone inner diameter 100 is approximately 1.04 inches.

The downhole end of the head cone 8 also has several other dimensional aspects. In some embodiments, a first head cone outer diameter 102 is between approximately 0.5 inches and 4.0 inches. In various embodiments, the first head cone outer diameter 102 is between approximately 1.5 inches and 2.5 inches. In some embodiments, the first head cone outer diameter 102 is approximately 1.9 inches. In some embodiments, a head cone first shoulder length 108 is between approximately 1.5 inches and 5.0 inches. In various embodiments, the head cone first shoulder length 108 is between approximately 2.5 inches and 3.5 inches. In some embodiments, the head cone first shoulder length 108 is approximately 3.075 inches.

In addition, the head cone 8 shown in FIG. 9 also comprises at least one aperture 104 that provides a location for a screw, a bolt, or other fastening means to pass through, which allows the selective interconnection between the nose cone 6 and the chassis. In some embodiments, a head cone aperture offset 106 is between approximately 0.5 inches and 4.0 inches. In various embodiments, the head cone aperture offset 106 is between approximately 1.5 inches and 2.5 inches. In some embodiments, the head cone aperture offset 106 is approximately 2 inches.

The uphole end of the head cone 8 has several dimensional aspects that facilitate the use of other components to selectively interconnect to the head cone 8 and the entire plunger. In some embodiments, a head cone first shoulder transition 110 is between approximately 1.5 inches and 5.0 inches. In various embodiments, the head cone first shoulder transition 110 is between approximately 2.25 inches and 3.5 inches. In some embodiments, the head cone first shoulder transition 110 is approximately 2.8 inches. In some embodiments, a head cone second shoulder length 112 is between approximately 1.5 inches and 4.5 inches. In various embodiments, the head cone second shoulder length 112 is between approximately 2.0 inches and 3.5 inches. In some embodiments, the head cone second shoulder length 112 is approximately 2.54 inches.

In some embodiments, a head cone second shoulder transition 114 is between approximately 0.5 inches and 3.0 inches. In various embodiments, the head cone second shoulder transition 114 is between approximately 1.125 inches and 1.625 inches. In some embodiments, the head cone second shoulder transition 114 is approximately 1.345 inches.

In some embodiments, a head cone recess length 116 is between approximately 0.625 inches and 2.0 inches. In various embodiments, the head cone recess length 116 is between approximately 0.875 inches and 1.25 inches. In some embodiments, the head cone recess length 116 is approximately 1.06 inches. In some embodiments, a head cone length 118 is between approximately 0.125 inches and 2.0 inches. In various embodiments, the head cone length 118 is between approximately 0.25 inches and 0.75 inches. In some embodiments, the head cone length 118 is approximately 0.35 inches.

In some embodiments, a head cone outer diameter 120 is between approximately 0.5 inches and 2.5 inches. In various embodiments, the head cone outer diameter 120 is between approximately 1.0 inch and 1.625 inches. In some embodiments, the head cone outer diameter 120 is approximately 1.38 inches.

In some embodiments, a head cone recess diameter 122 is between approximately 0.5 inches and 2.0 inches. In various embodiments, the head cone recess diameter 122 is between approximately 1.0 inch and 1.5 inches. In some embodiments, the head cone recess diameter 122 is approximately 1.19 inches.

Figure 10:
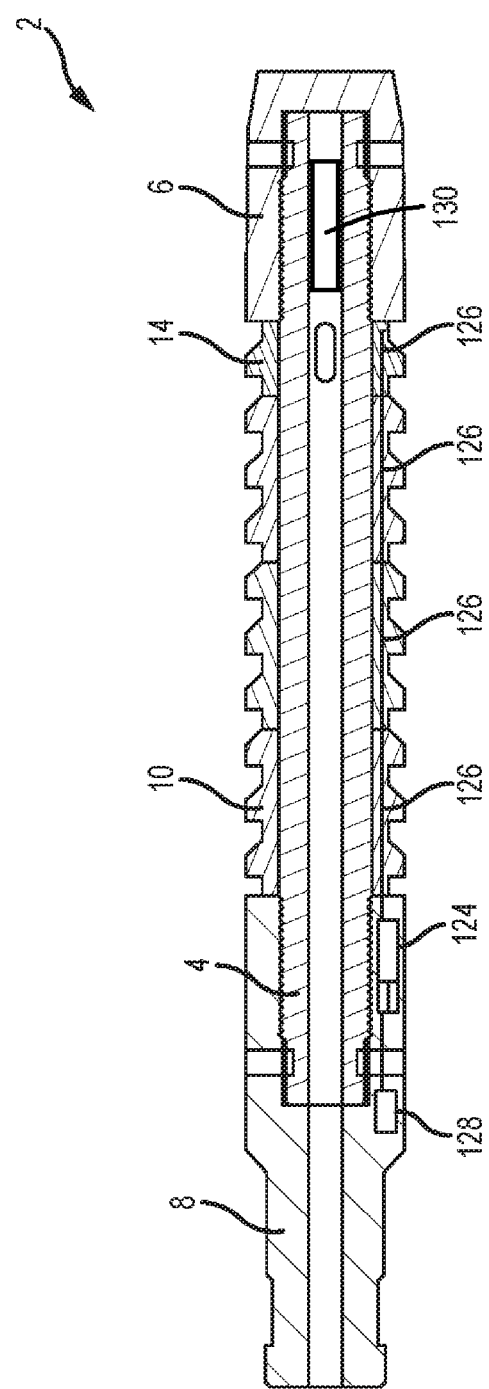
FIG. 10 is a cross-sectional view of a plunger having a system for delivering chemicals in accordance with various embodiments of the invention.

Now referring to FIG. 10, a cross-sectional view of a plunger 2 having a chemical delivery system is provided. The plunger 2 may store various chemicals to provide additional functionality to the plunger 2. For example, the plunger 2 may deliver corrosion inhibitors, scale inhibitors, soaps, biocides, lubricants, etc., and combinations thereof during the plunger's 2 descent, ascent, or position at the bottom of a well hole. As shown in FIG. 10, a pump 124 is provided in a portion of the plunger 2, which in this embodiment is a portion of the head cone 8. In alternative embodiments, the pump 124 may, for example, be disposed within the interior volume of the chassis 4. The pump 124 may be suspended within the interior volume or positioned to one side to allow fluid to enter the entrance aperture and pass through the interior volume of the chassis. It will be further appreciated that many different types of pumps 124 may be used to generate a pressure differential and to displace a volume of one or more chemicals. In this embodiment, a single piston pump 124 is used to store and deliver a volume of one or more chemicals.

The one or more chemicals may be delivered through a plurality of ports 126 as shown in FIG. 10. A channel operatively interconnects the ports 126 to the pump 124. In other embodiments, the nose cone 6, the chassis 4, and/or the head cone 8 may comprise one or more ports 126 to deliver the one or more chemicals. It will be appreciated that there may be no pump 124 in some embodiments. Instead, chemicals are supplied to a reservoir or reservoirs within the interior volume of the chassis 4, and the chemicals are passively emitted through one or more ports as the plunger 2 travels in and out of the well. In the multiple reservoir embodiments, different reservoirs may have different sizes, volume capacities, and may be charged with different pressures. This variability allows for customization of the rate, timing, etc. that the plunger 2 emits chemicals, and the multiple reservoirs allow for multi-component compounds to combine outside of the plunger 2.

A controller 128 is operatively interconnected to the pump 124 in FIG. 10. The controller 128 may be a timer that directs the pump 124 to begin delivering a chemical after a predetermined amount of time has elapsed. In other embodiments, the controller 128 may be a pressure sensor that detects a threshold pressure. In yet other embodiments, the controller 128 may determine the depth of the plunger 2 down the well and direct the pump 124 to deliver one or more chemicals at a predetermined depth or range of depths.

FIG. 10 also shows a chemical delivery float 130, which may be placed in the interior volume of the chassis 4 at the surface of the wellbore. Gravity pulls the float through the interior volume of the chassis 4, and the float 130 rests against the bolt 16 used to secure the nose cone 6 to the chassis 4. When the plunger 2 descends to the bottom of the wellbore and contacts a liquid, the liquid enters the ported bolt 16 and causes the chemical float 130 to rise through the interior volume of the chassis 4 since the chemical float 130 is less dense than the liquid (typical water which has a density of 1000 kg/m), and is thus buoyant. The chemical float 130 rises through the interior volume of the chassis 4 and emerges through the head cone 8 above the plunger 2 to deliver the chemicals from the 130 float. It will be appreciated that the various chemical delivery systems may be used in alone or in combination.

Figure 11:
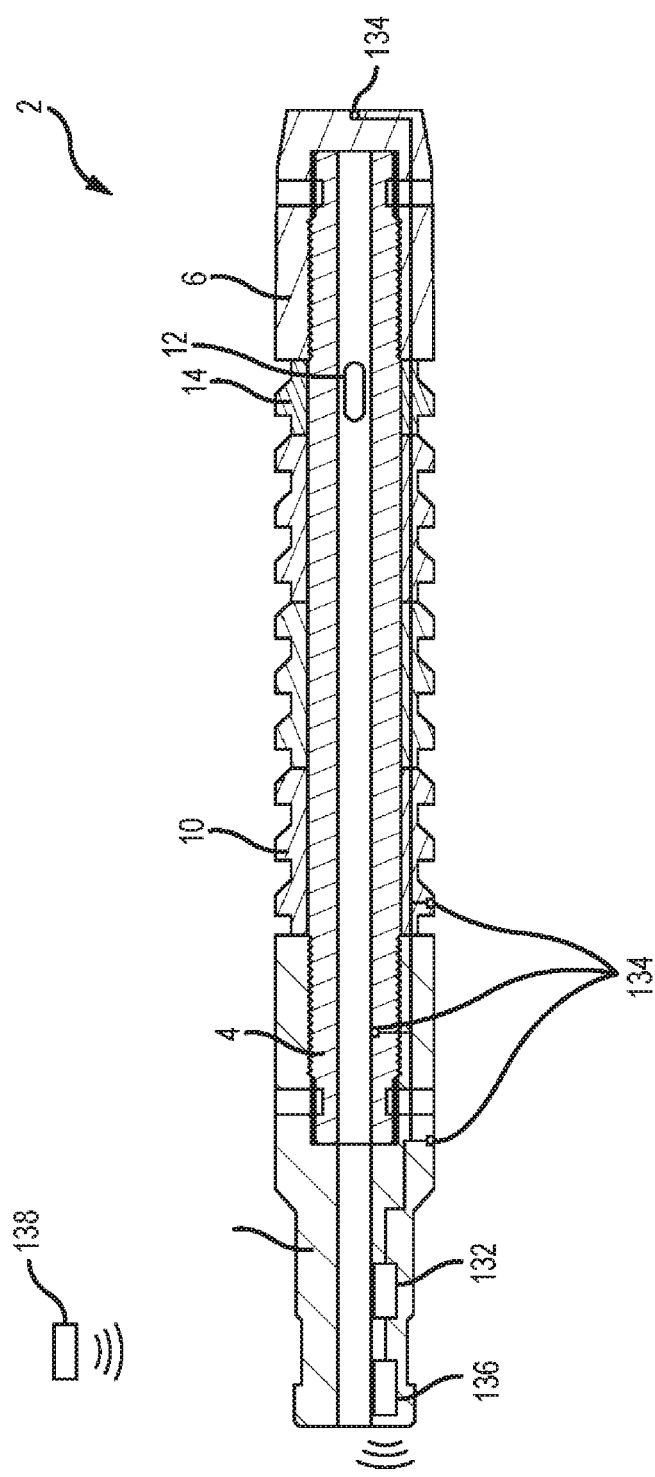
FIG. 11 is a cross-sectional view of a plunger having an electronic system for collecting various data in accordance with various embodiments of the invention.

Now referring to FIG. 11, a cross-sectional view of a plunger 2 having an electronic system for collecting data is provided. A central processing unit (CPU) 132 may be disposed in a portion of the plunger 2, which in this embodiment is the head cone 8 of the plunger 2. Sensors 134 may be disposed at various locations on the plunger 2, including the nose cone 6, the sleeves 10, the short sleeve 14, the chassis 4, and the head cone 8. The sensors 134 may collect various types of data. For example, a sensor 134 may detect sound or vibrations, chemicals, electric current or potential, fluid flow, radiation, position, angle of orientation, displacement, distance, speed, acceleration, pressure, force, heat, temperature, and other characteristics. Multiple types of sensors 134 may be utilized on a plunger 2. Data collected by the sensors 134 is sent the CPU 132, and in some embodiments, the CPU 132 may process the data. The CPU 132 may calculate, for example, the geometry of the well, characteristics of the resource or reservoir of resources in the well, the pressure and temperature as a function of well depth, various fluid levels, and plunger 2 diagnostics such as evaluating the plunger 2 for corrosion. In this particular example, electrical resistance detected on the surfaces of the plunger 2 may be used to model corrosion of the plunger 2.

Data processed by the CPU 132 or raw data from the sensors 134 may then be delivered to a first transceiver 136 for transmission to the surface of the well. In this embodiment, the first transceiver 136 establishes a wireless electronic communication with a second transceiver 138 at the surface of the well. The transceivers 136, 138 may use wireless data transmission protocols such as Bluetooth®, Infrared, WiFi, WiMax, 3G, LTE, etc. In other embodiments, the transceivers 136, 138 may use wired technologies such as Universal Serial Bus (USB) and Thunderbolt® to retrieve data once the plunger 2 ascends back to the surface of the well. In yet other embodiments, the plunger 2 maintains a wired electronic communication with the surface of the well as the plunger 2 descends and ascends from the well.

It will be appreciated that in other embodiments of the invention, the electronics may not be located in the head cone 8 of the plunger 2. For example, in an alternative embodiment, the CPU 130, the first transceiver 136, and other related electronics may be positioned within the interior volume of the chassis 4. These electronics may be contained within a separate housing in the interior volume of the chassis 4 to prevent interaction with fluid flowing through the entrance aperture and through the interior volume of the chassis 4. It will be further appreciated that the electronic devices in FIG. 11 may each have a non-transitory computer readable medium to store a data set collected from the sensors 134. As described, the electronic devices may communicate wirelessly or with a wired connection while the plunger 2 is downhole, or alternatively, the electronic device on the plunger 2 may dump the data set to an electronic device positioned at the surface of the well bore.

The present invention has significant benefits across a broad spectrum of endeavors. It is the Applicant's intent that this specification and the claims appended hereto be accorded a breadth in keeping with the scope and spirit of the present invention being disclosed despite what might appear to be limiting language imposed by the requirements of referring to the specific examples disclosed.

The phrases "at least one", "one or more", and "and/or", as used herein, are open-ended expressions that are both conjunctive and disjunctive in operation. For example, each of the expressions "at least one of A, B, and C", "at least one of A, B, or C", "one or more of A, B, and C", "one or more of A, B, or C," and "A, B, and/or C" means A alone, B alone, C alone, A and B together, A and C together, B and C together, or A, B, and C together.

Unless otherwise indicated, all numbers expressing quantities, dimensions, conditions, and so forth used in the specification, drawings, and claims are to be understood as being modified in all instances by the term "about."

The term "a" or "an" entity, as used herein, refers to one or more of that entity. As such, the terms "a" (or "an"), "one or more" and "at least one" can be used interchangeably herein.

The use of "including," "comprising," or "having," and variations thereof, is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. § 112(f). Accordingly, a claim incorporating the term "means" shall cover all structures, materials, or acts set forth herein, and all of the equivalents thereof. Further, the structures, materials, or acts, and the equivalents thereof, shall include all those described in the summary of the present invention, brief description of the drawings, detailed description, abstract, and claims themselves.

The foregoing description of the present invention has been presented for illustration and description purposes. However, the description is not intended to limit the present invention to only the forms disclosed herein. In the foregoing Detailed Description for example, various features of the present invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the present invention.

Consequently, variations and modifications commensurate with the above teachings and skill and knowledge of the relevant art are within the scope of the present invention.

The embodiments described herein above are further intended to explain best modes of practicing the present invention and to enable others skilled in the art to utilize the invention in such a manner, or include other embodiments with various modifications as required by the particular application(s) or use(s) of the present invention. Thus, it is intended that the claims be construed to include alternative embodiments to the extent permitted by the prior art.

The invention claimed is:

1. A plunger with replaceable components for a hydrocarbon wellbore, comprising:
   a chassis having an uphole end and a downhole end, wherein a head cone having an outer diameter is disposed at said uphole end of said chassis and a nose cone having an outer diameter is selectively interconnected to said downhole end of said chassis;
   a plurality of sleeves, wherein each sleeve has an aperture, and wherein said plurality of sleeves is disposed about said chassis between said head cone and said nose cone such that said chassis extends through said apertures of said sleeves;
   at least one rib disposed on an outer surface of each sleeve, said ribs having an outer diameter, wherein said outer diameter of at least one rib is greater than both said outer diameter of said head cone and said outer diameter of said nose cone;
   an interior volume defined by an interior surface of said chassis; and
   a chassis aperture in an outer surface of said chassis, wherein said chassis aperture provides fluid communication between said interior volume of said chassis and an external environment, and a sleeve of said plurality of sleeves is configured to at least partially cover said chassis aperture.

2. The plunger of claim 1, wherein said head cone is integrated with said chassis to form a continuous structure.

3. The plunger of claim 1, further comprising:
   an aperture defined by an interior surface of said head cone, wherein said aperture of said head cone provides fluid communication between said interior volume of said chassis and said external environment.

4. The plunger of claim 3, further comprising:
   a ported bolt configured to selectively interconnect said nose cone to said chassis, wherein said ported bolt has an aperture that provides fluid communication between said interior volume of said chassis and said external environment.

5. The plunger of claim 4, further comprising:
   wherein said selective interconnection between said nose cone and said chassis is a first thread, said first thread having a first thread handedness; and
   wherein said selective interconnection between said ported bolt and said chassis is a second thread, said second thread having a second thread handedness, wherein said first thread handedness is distinct from said second thread handedness.

6. The plunger of claim 4, further comprising a snap ring positioned between a head of said ported bolt and said nose cone to prevent rotation of said ported bolt relative to said nose cone.

7. The plunger of claim 3, further comprising:
   a float positioned in said interior volume of said chassis, said float having a density of less than 1000 kg/m$^3$, wherein said float is configured to travel past said aperture of said head cone when said float is in the presence of a fluid having a density greater than said float.

8. The plunger of claim 7, wherein said float is configured to release a chemical in the presence of said fluid having a density greater than said float, wherein said chemical is at least one of a corrosion inhibitor, a scale inhibitor, a soap, a biocide, and a lubricant, which is stored within a chamber positioned within said plunger.

9. A plunger with selectively interchangeable components for enhancing wellbore production from a hydrocarbon well hole, comprising:
   a chassis having an outer surface, an inner surface, a downhole end, and an uphole end, wherein said inner surface of said chassis defines an interior volume;
   at least one chassis aperture positioned on said chassis, said at least one chassis aperture allows fluid communication between said interior volume of said chassis and an external environment;
   at least one exit aperture positioned on said chassis, said at least one exit aperture allows fluid communication between said interior volume of said chassis and said external environment;
   a plurality of replaceable sleeves disposed about said outer surface of said chassis, said sleeves having an outer diameter with a predetermined dimension to engage an inner surface of a production tubing;
   a nose cone disposed on said downhole end of said chassis;
   a head cone disposed on said uphole end of said chassis;
   a chemical reservoir within said interior volume of said chassis, wherein a chemical is stored in said chemical reservoir and at least a portion of said chemical is emitted through said at least one chassis aperture to said external environment, wherein said chemical is at least one of a corrosion inhibitor, a scale inhibitor, a soap, a biocide, and a lubricant; and
   a float positioned in said interior volume of said chassis, said float having a density of less than 100 kg/m$^3$, wherein said float is configured to travel past said exit aperture and release at least a portion of said chemical when said float is in the presence of a fluid having a density greater than said float.

10. The plunger of claim 9, wherein at least one replaceable sleeve of said plurality of replaceable sleeves comprises a plurality of ribs on an outer surface of said at least one replaceable sleeve.

11. The plunger of claim 10, wherein at least one rib of said plurality of ribs has an outer diameter that is greater than both an outer diameter of said head cone and an outer diameter of said nose cone.

12. The plunger of claim 10, wherein at least one rib of said plurality of ribs comprises an uphole angle of 90 degrees.

13. The plunger of claim 10, wherein at least one rib of said plurality of ribs comprises a downhole angle of 45 degrees.

14. The plunger of claim 9, wherein said at least one chassis aperture comprises a longitudinal dimension, and a replaceable sleeve of said plurality of replaceable sleeves comprises a longitudinal dimension, wherein said longitudinal dimension of said replaceable sleeve is the same as said longitudinal dimension of said at least one chassis aperture.

15. The plunger of claim 9, further comprising:
   a sensor positioned on said outer surface of said chassis, said sensor configured to record a data set;
   a first electronic device positioned within said chassis, wherein said first electronic device is configured to store said data set from said sensor on a non-transitory computer readable medium;

a second electronic device positioned at a wellhead of said hydrocarbon well hole, wherein said first electronic device is configured to transmit said data set to said second electronic device, and said second electronic device is configured to store said data set from said sensor on a non-transitory computer readable medium.

16. The plunger of claim 9, further comprising a replaceable sleeve of said plurality of replaceable sleeves positioned over said at least one chassis aperture.

17. The plunger of claim 9, wherein said chemical from said chemical reservoir is passively emitted through said at least one chassis aperture.

18. A plunger system for a wellbore, comprising:

a chassis having an uphole end and a downhole end, and a head cone having an outer diameter disposed at said uphole end of said chassis and a nose cone having an outer diameter selectively interconnected to said downhole end of said chassis;

an interior volume defined by an interior surface of said chassis;

an aperture defined by an interior surface of said head cone, wherein said aperture of said head cone provides fluid communication between said interior volume of said chassis and an external environment;

a ported bolt configured to selectively interconnect said nose cone to said chassis, wherein said ported bolt has an aperture that provides fluid communication between said interior volume of said chassis and said external environment;

wherein said selective interconnection between said nose cone and said chassis is a first thread;

wherein said selective interconnection between said ported bolt and said chassis is a second thread, wherein said first thread is distinct from said second thread;

a plurality of replaceable sleeves, wherein each replaceable sleeve has an aperture, and wherein said plurality of replaceable sleeves is disposed about said chassis between said head cone and said nose cone such that said chassis extends through said apertures of said replaceable sleeves;

at least one rib disposed on an outer surface of each replaceable sleeve, said ribs having an outer diameter, wherein said outer diameter of at least one rib is greater than both said outer diameter of said head cone and said outer diameter of said nose cone; and a float positioned in said interior volume of said chassis, said float having a density of less than 1000 kg/m$^3$, wherein said float is configured to travel past said aperture of said head cone when said float is in the presence of a fluid having a density greater than said float, wherein said float is configured to release a chemical in the presence of said fluid having a density greater than said float, wherein said chemical is at least one of a corrosion inhibitor, a scale inhibitor, a soap, a biocide, and a lubricant, which is stored within a chamber positioned within said plunger.

* * * * *